(12) United States Patent
Tanahashi et al.

(10) Patent No.: US 9,759,171 B2
(45) Date of Patent: Sep. 12, 2017

(54) INTAKE DEVICE FOR VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/882,978

(22) Filed: Oct. 14, 2015

(65) Prior Publication Data
US 2016/0108868 A1  Apr. 21, 2016

(30) Foreign Application Priority Data

Oct. 16, 2014  (JP) ................................. 2014-211952

(51) Int. Cl.
| | | |
|---|---|---|
| *F02M 35/10* | (2006.01) | |
| *B60K 13/02* | (2006.01) | |
| *F02M 35/104* | (2006.01) | |
| *F15D 1/06* | (2006.01) | |

(52) U.S. Cl.
CPC ....... *F02M 35/10242* (2013.01); *B60K 13/02* (2013.01); *F02M 35/104* (2013.01); *F02M 35/10249* (2013.01); *F02M 35/10321* (2013.01); *F15D 1/06* (2013.01)

(58) Field of Classification Search
CPC ............. F02M 35/10039; F02M 35/10; F02M 35/10262; F02M 35/104; F02M 35/10249; F02M 35/10268; F02M 35/1045; F02M 35/10124
See application file for complete search history.

(56) References Cited

U.S. PATENT DOCUMENTS

| | | |
|---|---|---|
| 3,597,668 A | 8/1971 | Yoshimine |
| 3,922,214 A | 11/1975 | Van Cakenberghe |
| 4,610,284 A | 9/1986 | Bartholomew |
| 4,795,935 A | 1/1989 | Fujii et al. |

(Continued)

FOREIGN PATENT DOCUMENTS

| | | |
|---|---|---|
| JP | S50-026778 A | 3/1975 |
| JP | S61-194999 A | 8/1986 |

(Continued)

OTHER PUBLICATIONS

Office Action issued in U.S. Appl. No. 15/018,085 on Dec. 14, 2016.

(Continued)

*Primary Examiner* — Hai Huynh
*Assistant Examiner* — Long T Tran
(74) *Attorney, Agent, or Firm* — Andrews Kurth Kenyon LLP

(57) ABSTRACT

An intake device for a vehicle, in which an intake passage wall surface defining an intake passage is charged with positive charges, includes: a self-discharge static eliminator that is provided on the intake passage wall surface and that decreases an electrification charge amount on that part of the intake passage wall surface which is within a limited range around a mounting part of the self-discharge static eliminator, by providing the self-discharge static eliminator on the intake passage wall surface.

7 Claims, 8 Drawing Sheets

(56) References Cited

U.S. PATENT DOCUMENTS

| | | | |
|---|---|---|---|
| 5,095,400 A | 3/1992 | Saito | |
| 5,382,359 A | 1/1995 | Brandt | |
| 6,235,385 B1 | 5/2001 | Lee | |
| 6,653,646 B1* | 11/2003 | Shibata | B01J 19/081 123/536 |
| 7,248,454 B2 | 7/2007 | Takayanagi | |
| 7,612,352 B2* | 11/2009 | Iizuka | G21G 4/04 123/539 |
| 7,684,169 B1 | 3/2010 | Larkin | |
| 7,832,528 B1 | 11/2010 | Liang | |
| 7,971,689 B2 | 7/2011 | Moore | |
| 8,039,823 B2* | 10/2011 | Iizuka | G21G 4/04 123/539 |
| 8,503,154 B2 | 8/2013 | Nakai | |
| 9,044,916 B2 | 6/2015 | Koike et al. | |
| 2002/0179311 A1 | 12/2002 | Alper | |
| 2003/0183465 A1 | 10/2003 | Ikeda | |
| 2006/0277990 A1* | 12/2006 | Saito | G01F 1/6842 73/204.22 |
| 2008/0022766 A1* | 1/2008 | Saito | G01F 1/6842 73/204.22 |
| 2008/0036241 A1 | 2/2008 | Aisenbrey | |
| 2012/0039012 A1 | 2/2012 | Nakai | |
| 2016/0059838 A1 | 3/2016 | Yamada et al. | |
| 2016/0177811 A1 | 6/2016 | Tanahashi et al. | |
| 2016/0186639 A1 | 6/2016 | Tanahashi et al. | |
| 2016/0186703 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi et al. | |
| 2016/0223024 A1 | 8/2016 | Tanahashi et al. | |
| 2016/0230824 A1 | 8/2016 | Tanahashi et al. | |
| 2016/0280162 A1 | 9/2016 | Yamada et al. | |

FOREIGN PATENT DOCUMENTS

| | | |
|---|---|---|
| JP | H05-238438 A | 9/1993 |
| JP | 2000-019296 A | 1/2000 |
| JP | 2001-355524 A | 12/2001 |
| JP | 2002104106 A | 4/2002 |
| JP | 2004-011563 A | 1/2004 |
| JP | 2006-234093 A | 9/2006 |
| JP | 2008-181694 A | 8/2008 |
| JP | 2009-191852 A | 8/2009 |
| JP | 2010-177128 A | 8/2010 |
| JP | 2010192177 A | 9/2010 |
| JP | 2011-047320 A | 3/2011 |
| JP | 2012-024746 A | 2/2012 |
| JP | 2016-049880 A | 4/2016 |
| WO | 2015064195 A1 | 5/2015 |

OTHER PUBLICATIONS

US Patent and Trademark Office, Office Action in U.S. Appl. No. 15/018,085 daed Jun. 7, 2017, 13 pages.

* cited by examiner

F I G . 9A
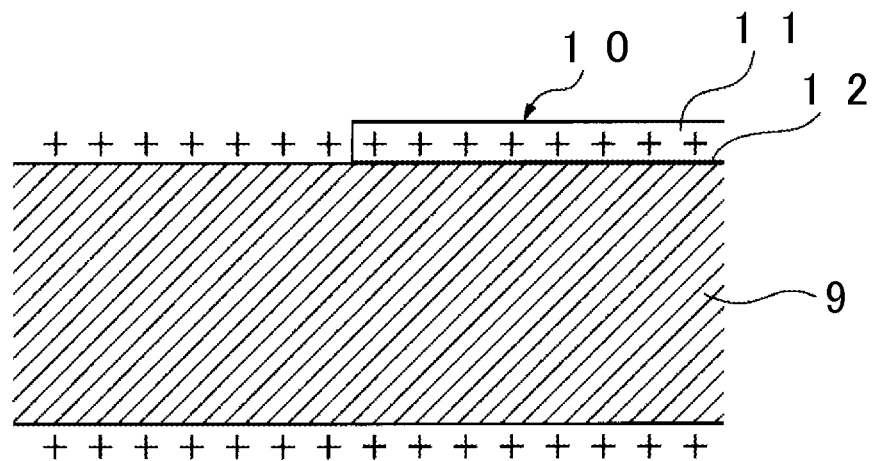
F I G . 9B
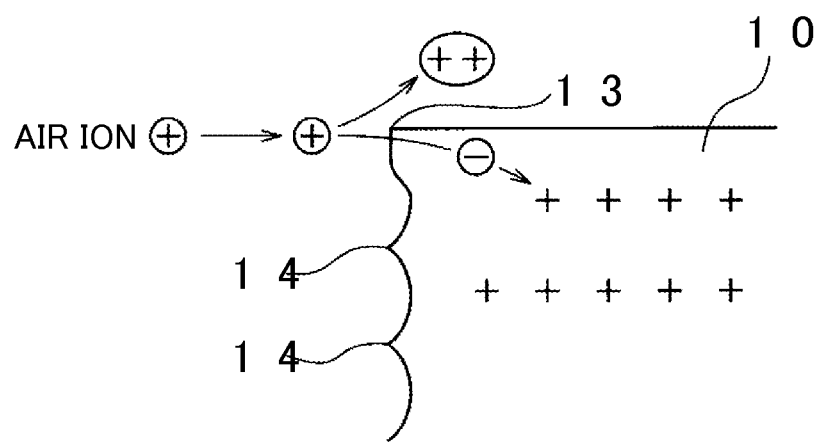

INTAKE DEVICE FOR VEHICLE

INCORPORATION BY REFERENCE

The disclosure of Japanese Patent Application No. 2014-211952 filed on Oct. 16, 2014 including the specification, drawings and abstract is incorporated herein by reference in its entirety.

BACKGROUND OF THE INVENTION

1. Field of the Invention

The present invention relates to an intake device of a vehicle.

2. Description of Related Art

Japanese Patent Application Publication No. 5-238438 (JP 5-238438 A) describes a vehicle configured such that a discharge device such as a discharge antenna is attached to an engine of a vehicle or a member associated with the engine, so that high-voltage electricity, static electricity, or the like generated from an engine portion or stored in the engine portion is discharged and released outside, so as to improve fuel efficiency accordingly.

SUMMARY OF THE INVENTION

JP 5-238438 A describes that the vehicle is charged with static electricity, and the static electricity thus charged to the vehicle has some sort of influence on driving of the vehicle. However, a specific reason why the static electricity thus charged to the vehicle has an influence on the driving of the vehicle and what kind of influence is caused are not found well. As such, if a specific reason why the static electricity thus charged to the vehicle has an influence on the driving of the vehicle and what kind of influence is caused are not found well, it is difficult to deal with the charge to the vehicle with the static electricity appropriately.

In view of this, the inventor of the present invention focused on an intake system of a vehicle, particularly, and studied a specific reason why static electricity charged to a vehicle has an influence on the intake system of the vehicle and what kind of influence is caused. As a result of the study, a necessary appropriate static elimination technique was found to improve intake efficiency of intake air.

That is, an intake device for a vehicle according to an aspect of the present invention in which an intake passage wall surface defining an intake passage is charged with positive charges, includes a self-discharge static eliminator that is provided on the intake passage wall surface and that decreases an electrification charge amount on that part of the intake passage wall surface which is within a limited range around a mounting part of the self-discharge static eliminator, by providing the self-discharge static eliminator on the intake passage wall surface.

Further, in the above aspect, the self-discharge static eliminator may be provided on an outer wall surface of the intake passage wall.

Further, in the above aspect, the self-discharge static eliminator may be provided on an intake passage wall surface of an intake air flow path reduced section part at which an intake air flow path section is reduced on an intake air flow path.

Further, in the above aspect, the self-discharge static eliminator may be provided on at least one of an air introduction port to the intake device, an air cleaner outlet port, and a surge tank outlet port.

Further, in the above configuration, the self-discharge static eliminator may be provided only on an air introduction port to the intake device, an air cleaner outlet port, and a surge tank outlet port.

Further, in the above aspect, the self-discharge static eliminator may be provided on an intake passage wall surface of each of all intake air flow path reduced section parts at which an intake air flow path section is reduced on an intake air flow path.

Further, in the above aspect, the self-discharge static eliminator may be provided on an intake passage wall surface that causes detachment of intake air on an inner wall surface of the intake passage wall at the time when an electrification charge amount increases.

Further, in the above aspect, the intake passage wall may be made of a synthetic resin material.

Further, in the above aspect, the self-discharge static eliminator may be a metal foil attached to the intake passage wall surface with a conductive adhesive.

Further, in the above configuration, the self-discharge static eliminator may include a corner portion for causing self-discharge.

Further, in the above configuration, the self-discharge static eliminator may have an elongated rectangular planar shape.

Further, in the above aspect, the self-discharge static eliminator may be a conductive film integrally formed on the intake passage wall surface.

By providing the self-discharge static eliminator according to the above aspect on the intake passage wall surface, it is possible to markedly improve intake efficiency of intake air.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9A is a view to describe a self-discharge operation; and

FIG. 9B is a view to describe the self-discharge operation.

DETAILED DESCRIPTION OF EMBODIMENTS

Figure 1:
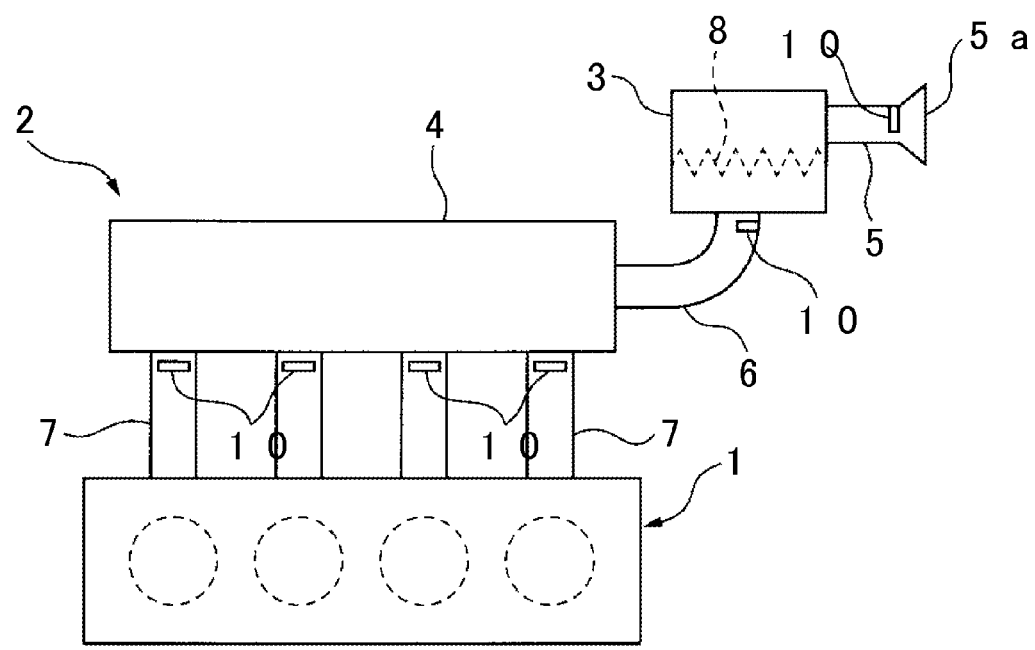
FIG. 1 is a general view schematically illustrating an intake device of a vehicle.

FIG. 1 schematically illustrates an intake device of a vehicle. Referring now to FIG. 1, a reference sign 1 indicates an engine, and a reference sign 2 indicates an intake device. As illustrated in FIG. 1, the intake device 2 is constituted by an air cleaner 3, a surge tank 4, an intake air introduction pipe 5 to the air cleaner 3, an intake air duct 6 extending toward the surge tank 4 from the air cleaner 3, and intake air branch pipes 7 extending toward the engine 1 from the surge tank 4. Note that a broken line 8 in FIG. 1 indicates an air filter. Intake air flows from an intake air introduction port 5a of the intake air introduction pipe 5 into the air cleaner 3 via the intake air introduction pipe 5, and then, the intake air flows into the intake air duct 6 through the air filter 8. Subsequently, the intake air flows into the surge tank 4 from the intake air duct 6, and then supplied to the engine 1 via the intake air branch pipes 7.

In the intake device 2 illustrated in FIG. 1, an area from the intake air introduction port 5a to downstream ends of the intake air branch pipes 7 constitutes an intake passage, and the intake passage is defined by a pipe wall of the intake air introduction pipe 5, a peripheral wall of the air cleaner 3, a pipe wall of the intake air duct 6, a peripheral wall of the surge tank 4, and pipe walls of the intake air branch pipes 7. Accordingly, in the intake device 2 illustrated in FIG. 1, the pipe wall of the intake air introduction pipe 5, the peripheral wall of the air cleaner 3, the pipe wall of the intake air duct 6, the peripheral wall of the surge tank 4, and the pipe walls of the intake air branch pipes 7 constitute an intake passage wall defining the intake passage. In the intake device 2 illustrated in FIG. 1, the pipe wall of the intake air introduction pipe 5, the peripheral wall of the air cleaner 3, the pipe wall of the intake air duct 6, the peripheral wall of the surge tank 4, and the pipe walls of the intake air branch pipes 7, that is, the intake passage wall defining the intake passage is made of a nonconductive synthetic resin material.

Figure 2A:
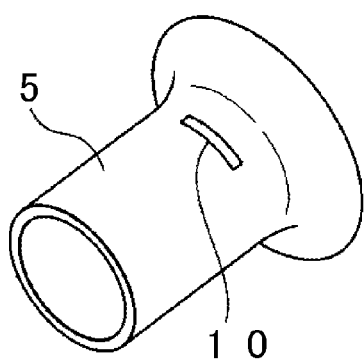
FIG. 2A is a perspective view of an intake air introduction pipe to an air cleaner.
Figure 2B:
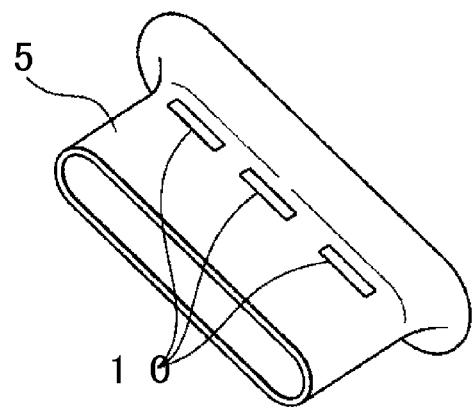
FIG. 2B is a perspective view of an intake air introduction pipe to the air cleaner.
Figure 3:
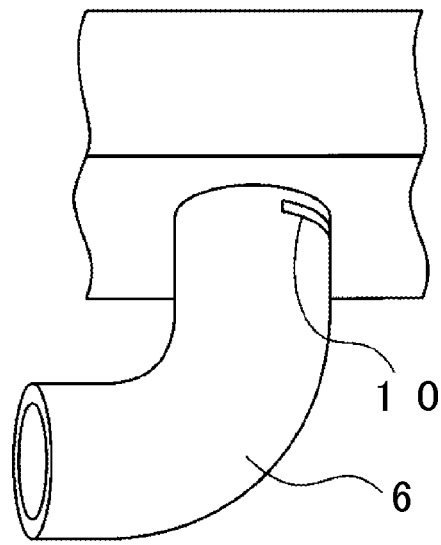
FIG. 3 is a perspective view of an intake air duct extending from the air cleaner toward a surge tank.
Figure 4:
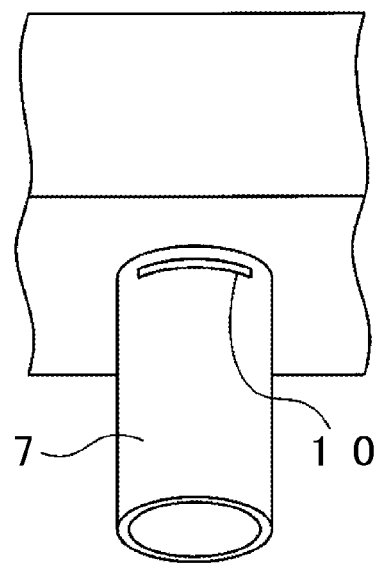
FIG. 4 is a perspective view of an intake air branch pipe extending from the surge tank toward an engine.

FIG. 2A is a perspective view of the intake air introduction pipe 5 illustrated in FIG. 1, and FIG. 2B is a perspective view of another example of the intake air introduction pipe 5 illustrated in FIG. 1. Further, FIG. 3 is a perspective view of the intake air duct 6 illustrated in FIG. 1, and FIG. 4 is a perspective view of the intake air branch pipe 7 illustrated in FIG. 1.

Now, when a vehicle is caused to run, each part of a tire repeats contact and detachment with respect to a road surface, so as to generate static electricity, and also, component parts of the engine 1 and component parts of a braking device move relative to each other, so as to generate electricity. Further, static electricity is also generated when an air flows while making frictional contact with an outer peripheral surface of the vehicle during running of the vehicle. Due to the static electricity generated as such, a body of the vehicle, the engine 1, and the like are charged with electric charges, and the intake device 2 is also charged with electric charges. At this time, it is found that the intake device 2, namely, an intake passage wall surface defining the intake passage is charged with positive charges. Besides, it is found that a voltage value on the intake passage wall surface defining the intake passage may reach 1000 (v) or more, which is a high voltage. Accordingly, in the intake device 2 illustrated in FIG. 1, voltage values of surfaces of the pipe wall of the intake air introduction pipe 5, the peripheral wall of the air cleaner 3, the pipe wall of the intake air duct 6, the peripheral wall of the surge tank 4, and the pipe walls of the intake air branch pipes 7 may reach 1000 (v) or more, which is a high voltage.

Figure 6A:
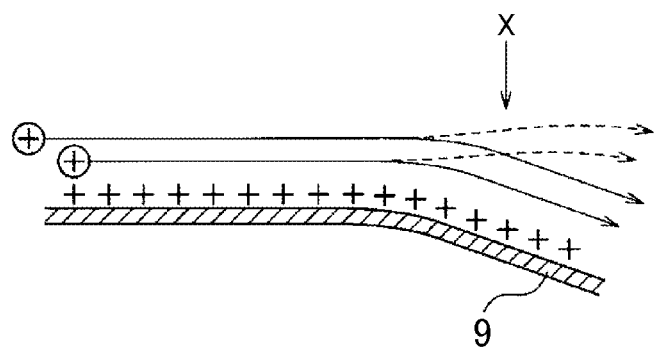
FIG. 6A is a view to describe a change of the intake air flow.

In the meantime, it is found that, if a thin wall surface made of the nonconductive synthetic resin material, such as the intake passage wall, has a high voltage value, a flow of an air along the thin wall surface changes. In view of this, first of all, the following describes how the flow of the air along the thin wall surface changes depending on a voltage value on the thin wall surface, based on the phenomenon found by the inventor by experiment. FIG. 6A illustrates a case where the air flows along the front surface of a thin wall 9 charged with positive charges. In this case, the air tends to be positively charged, so FIG. 6A illustrates a case where the air charged with positive charges flows along the front surface of the thin wall 9 charged with positive charge. Now, In FIG. 6A, an arrow of a continuous line indicates a case where the front surface of the thin wall 9 has a low voltage value, and in this case, the air flows along the front surface of the thin wall 9. In contrast, an arrow of a broken line indicates a case where the front surface of the thin wall 9 has a high voltage value. In this case, the air flows so as to be separated from the front surface of the thin wall 9 at that part of the front surface of the thin wall 9 which is curved downward, that is, a part where the air flow is easily separated from the front surface of the thin wall 9.

Figure 6B:
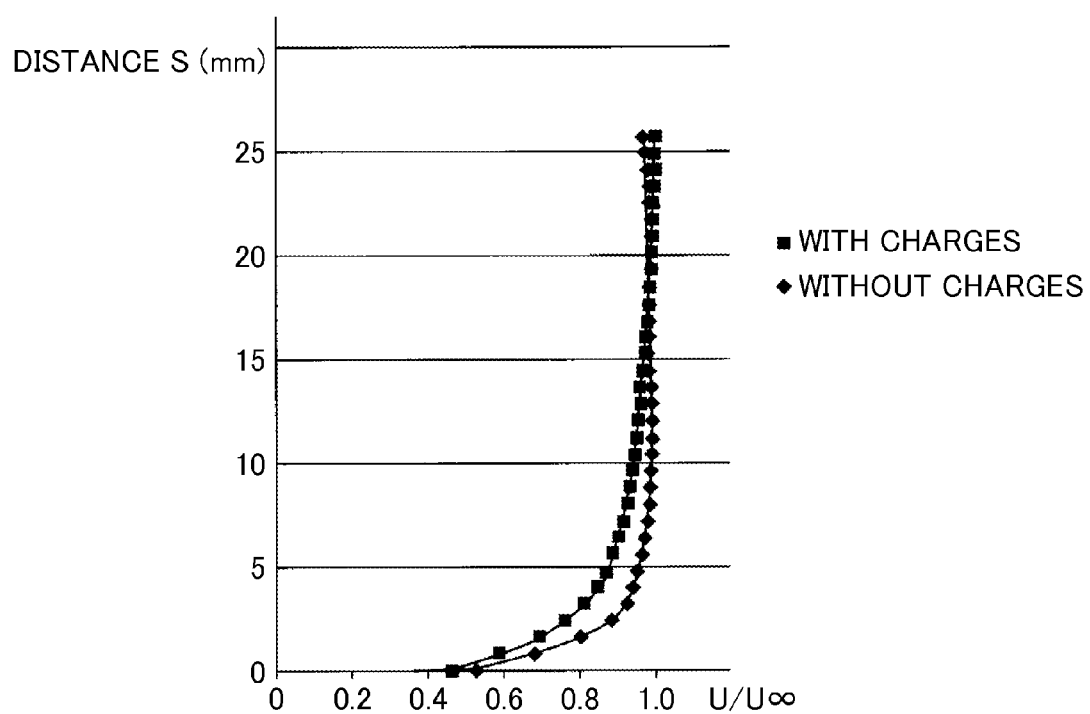
FIG. 6B is a view to describe a change of the intake air flow.

FIG. 6B indicates a measured value, at a point X (FIG. 6A), of a velocity ratio $U/U_\infty$ between a flow velocity $U_\infty$ of the mainstream of the air flowing along the front surface of the thin wall 9 in FIG. 6A and a flow velocity U at a position distanced from the front surface of the thin wall 9 only by a distance S. Note that each point indicated by a black diamond in FIG. 6B indicates a case where the front surface of the thin wall 9 is not charged with positive charges, and each point indicated by a black quadrangle in FIG. 6B indicates a case where the front surface of the thin wall 9 is charged with positive charges. From FIG. 6B, the following fact is found. That is, in a case where the front surface of the thin wall 9 is charged with positive charges, a velocity boundary layer is separated from the front surface of the thin wall 9, in comparison with a case where the front surface of the thin wall 9 is not charged with positive charges. Accordingly, it is found that, in a case where the front surface of the thin wall 9 is charged with positive charges, the air flows so as to be separated from the front surface of the thin wall 9 as indicated by the arrow of the broken line in FIG. 6A.

As described above, the air tends to be positively charged, so that the air partially becomes positive air ions (indicated by a circled "+"). Accordingly, in a case where the front surface of the thin wall 9 is charged with positive charges, a repulsive force acts between the positive air ions and the front surface of the thin wall 9. Hereby, as indicated by the arrow of the broken line in FIG. 6A, the air flows so as to be separated from the front surface of the thin wall 9 at that part of the front surface of the thin wall 9 which is curved downward, that is, a part where the airflow is easily separated from the front surface of the thin wall 9. As such, it is confirmed, by experiments, that the airflow flowing along the front surface of the thin wall 9 is separated from the front surface of the thin wall 9 due to charging to the front surface of the thin wall 9 with positive charges. In this case, it is found that the airflow flowing along the front surface of the thin wall 9 is more separated from the front surface of the thin wall 9 as the front surface of the thin wall 9 has a higher voltage value.

Further, it is found that, in a case where the thin wall 9 has a surface shape that easily causes detachment of the airflow, when the front surface of the thin wall 9 is not charged with positive charges, detachment of the airflow does not occur, but when the front surface of the thin wall 9 is charged with positive charges, detachment of the airflow may occur. Further, in a case where the front surface of the thin wall 9 is charged with positive charges, a magnitude of the detachment of the airflow increases, in comparison with a case where the front surface of the thin wall 9 is not charged with positive charges. As such, it is confirmed that when the front surface of the thin wall 9 is charged with positive charges, the airflow is separated from the front surface of the thin wall 9, or the detachment of the air is cause based on an electric repulsive force.

Figure 7A:
FIG. 7A is a view illustrating a self-discharge static eliminator.
Figure 7B:
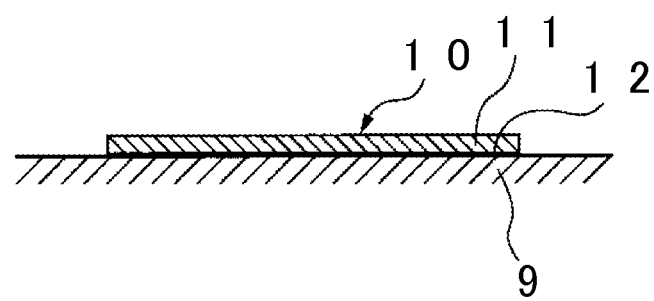
FIG. 7B is a view illustrating the self-discharge static eliminator.
Figure 7C:
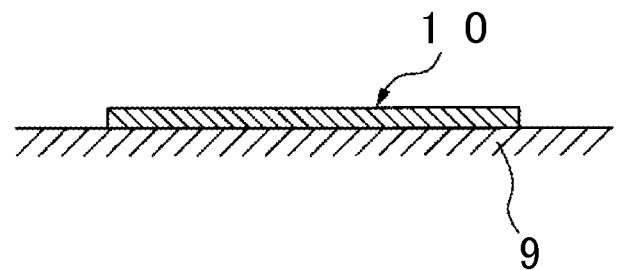
FIG. 7C is a view illustrating a self-discharge static eliminator.

In the meantime, in order that the flow of the air along the front surface of the thin wall 9 at the time when the front surface of the thin wall 9 is charged with positive charges is returned to the flow of the air of a case where the front surface of the thin wall 9 is not charged with positive charges, it is necessary to remove all of or part of the positive charges charged on the front surface of the thin wall 9, that is, it is necessary to eliminate electricity from the front surface of the thin wall 9, so as to decrease the voltage value of the front surface of the thin wall 9. In this case, in the present invention, a self-discharge static eliminator is used to eliminate electricity from the front surface of the thin wall 9, and examples of the self-discharge static eliminator are illustrated in FIGS. 7A to 7C. Note that FIGS. 7A and 7B are a plan view and a sectional side view of a representative self-discharge static eliminator 10, respectively, and FIG. 7C is a sectional side view of another self-discharge static eliminator 10.

In the example illustrated in FIGS. 7A and 7B, the self-discharge static eliminator 10 has an elongated rectangular planar shape, and is a metal foil 11 to be attached to the front surface of the thin wall 9 with a conductive adhesive 12. In the meantime, in the example illustrated in FIG. 7C, the self-discharge static eliminator 10 is a conductive thin film integrally formed on the front surface of the thin wall 9. In the present invention, with the use of the self-discharge static eliminator 10 as illustrated in FIGS. 7A to 7C, electricity is eliminated from a part of the front surface of the thin wall 9. Note that, in the embodiment of the present invention, with the use of such a self-discharge static eliminator 10, electricity is eliminated from a part of an intake passage wall surface illustrated in FIG. 1.

Figure 8A:
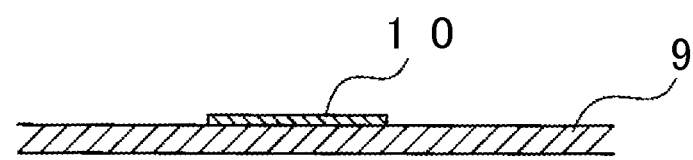
FIG. 8A is a view to describe a static elimination operation by the self-discharge static eliminator.
Figure 8B:
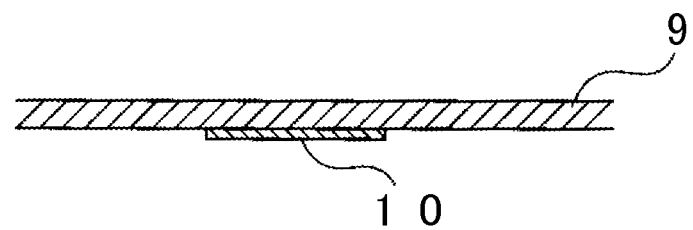
FIG. 8B is a view to describe the static elimination operation by the self-discharge static eliminator.
Figure 8C:
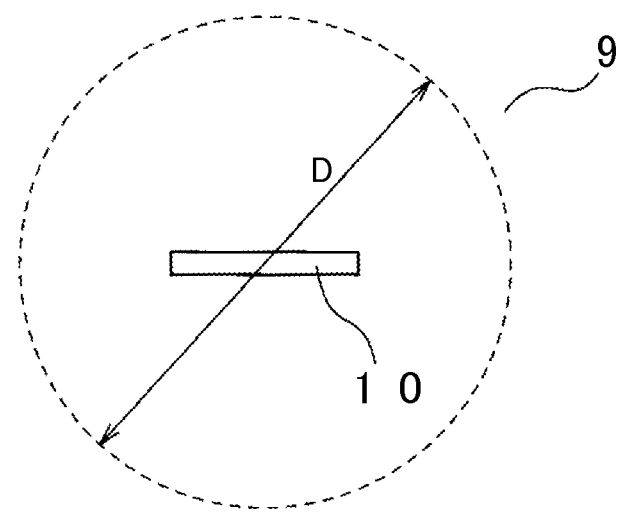
FIG. 8C is a view to describe the static elimination operation by the self-discharge static eliminator.

FIG. 8A illustrates a case where the self-discharge static eliminator 10 illustrated in FIGS. 7A and 7B is placed on the front surface of the thin wall 9. It is found that, when the self-discharge static eliminator 10 is provided on the front surface of the thin wall 9 as such, an electrification charge amount on that part of the front surface of the thin wall 9 which is within a limited range illustrated by a broken line around a mounting part of the self-discharge static eliminator 10 is decreased as illustrated in FIG. 8C, and as a result, a voltage on that part of the front surface of the thin wall 9 which is within the limited range indicated by the broken line in FIG. 8C is decreased. Accordingly, in order that the flow of the air along the front surface of the thin wall 9 is returned to the flow of the air of a case where the front surface of the thin wall 9 is not charged with positive charges, the self-discharge static eliminator 10 should be provided on that part of the front surface of the thin wall 9 at which the flow of the air should be returned to the flow of the air of a case where the positive charges are not charged. In this case, it is found that, even if the self-discharge static eliminator 10 is provided on a back surface of the thin wall 9 as illustrated in FIG. 8B, the electrification charge amount, that is, the voltage on that part of the front surface of the thin wall 9 which is within the limited range indicated by the broken line around the mounting part of the self-discharge static eliminator 10 can be decreased as illustrated in FIG. 8C.

In this case, a static elimination mechanism at the time when electricity is eliminated from the front surface of the thin wall 9 by the self-discharge static eliminator 10 is not clarified. However, it is presumed that, due to a discharge operation of positive charges from the self-discharge static eliminator 10, a static elimination operation is performed on that part of the front surface of the thin wall 9 which is around the mounting part of the self-discharge static eliminator 10. Next will be described a static elimination mechanism presumably performed on the front surface of the thin wall 9, with reference to FIG. 9A illustrating an enlarged sectional view of the thin wall 9 and FIG. 9B illustrating an enlarged view of an end part of the self-discharge static eliminator 10 illustrated in FIG. 9A.

As described above, the thin wall 9 is made of a nonconductive synthetic resin material. When the thin wall 9 is made of a nonconductive synthetic resin material as such, an inside part of the thin wall 9 is not charged with electric charges, and the front surface of the thin wall 9 is charged with electric charge. Note that, it is confirmed that both of an outer surface and an inner surface of the intake passage wall illustrated in FIG. 1 is charged with positive charges. In the embodiment of the present invention, electricity is eliminated from part of the intake passage wall surface. Accordingly, FIG. 9A illustrates a case where the front surface and the back surface of the thin wall 9 are both charged with positive charges, assuming a case where electricity is eliminated from the intake passage wall surface. On the other hand, as described above, the self-discharge static eliminator 10 is the metal foil 11 attached to the front surface of the thin wall 9 with the conductive adhesive 12. The metal foil 11 and the conductive adhesive 12 are both conductive. Accordingly, an inner part of the metal foil 11, that is, an inner part of the self-discharge static eliminator 10 is charged with positive charges.

In the meantime, a voltage of the self-discharge static eliminator 10 is approximately equal to a voltage of that part of the front surface of the thin wall 9 which is around the self-discharge static eliminator 10, and accordingly, the voltage of the self-discharge static eliminator 10 is considerably high. On the other hand, as described above, the air tends to be positively charged, so that the air partially becomes positive air ions (indicated by a circled "+"). In this case, when a potential of the air ions is compared with a potential of the self-discharge static eliminator 10, the potential of the self-discharge static eliminator 10 is considerably higher than the potential of the air ions. Accordingly, when an air ion approaches a corner portion 13 of the self-discharge static eliminator 10 as illustrated in FIG. 9B, for example, an electric field intensity between the air ion and the corner portion 13 of the self-discharge static eliminator 10 becomes high, thereby resulting in that discharge is caused between the air ion and the corner portion 13 of the self-discharge static eliminator 10.

When discharge is caused between the air ion and the corner portion 13 of the self-discharge static eliminator 10, some electrons of the air ion move into the self-discharge static eliminator 10 as illustrated in FIG. 9B. Accordingly, a positively charged amount of the air ion increases (indicated by a circled "++"), so that the positive charges charged to the self-discharge static eliminator 10 are neutralized by the electrons thus moving in to the self-discharge static eliminator 10. Once the discharge is performed, the discharge is easily caused. When another air ion approaches the corner portion 13 of the self-discharge static eliminator 10, discharge is immediately caused between the air ion and the corner portion 13 of the self-discharge static eliminator 10. That is, when the air around the self-discharge static eliminator 10 moves, the air ions successively approach the corner portion 13 of the self-discharge static eliminator 10, so that discharge is continuously caused between the air ions and the corner portion 13 of the self-discharge static eliminator 10.

When discharge is continuously caused between the air ions and the corner portion 13 of the self-discharge static eliminator 10, positive charges charged to the self-discharge static eliminator 10 are successively neutralized, thereby resulting in that an amount of the positive charges charged to the self-discharge static eliminator 10 decreases. When the amount of the positive charges charged to the self-discharge static eliminator 10 decreases, the positive charges charged to that part of the front surface of the thin wall 9 which is around the self-discharge static eliminator 10 move into the self-discharge static eliminator 10, so that an amount of the positive charges charged to that part of the front surface of the thin wall 9 which is around the self-discharge static eliminator 10 also decreases. As a result, the voltages of the self-discharge static eliminator 10 and that part of the front surface of the thin wall 9 which is around the self-discharge static eliminator 10 gradually decrease. Such a voltage decrease action of the self-discharge static eliminator 10 and that part of the front surface of the thin wall 9 which is around the self-discharge static eliminator 10 continues until the voltage of the self-discharge static eliminator 10 becomes lower to stop a discharge action. As a result, as illustrated in FIG. 8C, the voltage on that part of the front surface of the thin wall 9 which is within the limited range indicated by the broken line around the mounting part of the self-discharge static eliminator 10 decreases.

On the other hand, as described above, when discharge is caused between the air ions and the corner portion 13 of the self-discharge static eliminator 10, an air ion (indicated by the circled "++") having an increased positively charged amount is generated, and the air ion with the increased positively charged amount flies in the air around the self-discharge static eliminator 10, as illustrated in FIG. 9B. An amount of the air ions with the increased positively charged amount is extremely smaller than an amount of the air flowing around the self-discharge static eliminator 10. Note that, in a case where the air ions do not move because the air around the self-discharge static eliminator 10 stagnates, discharge does not occur continuously, so that the voltage of the front surface of the thin wall 9 does not decrease. That is, in order to decrease the voltage of the front surface of the thin wall 9, it is necessary to flow the air around the self-discharge static eliminator 10.

The discharge between the air ions and the self-discharge static eliminator 10 is caused between the air ions and the corner portion 13 of the self-discharge static eliminator 10, or between the air ion and tip parts 14 of a peripheral portion of the self-discharge static eliminator 10. Accordingly, in order to easily cause discharge between the air ions and the self-discharge static eliminator 10, it may be said that it is preferable to form many tip parts 14 in addition to the corner portion 13 in the peripheral portion of the self-discharge static eliminator 10. Accordingly, when the self-discharge static eliminator 10 is formed, it is preferable that, in a course of forming the metal foil 11 by cutting a metal foil with a large dimension, the metal foil be cut so that burrs such as the tip parts 14 are formed on a cut surface.

The metal foil 11 of the self-discharge static eliminator 10 illustrated in FIGS. 7A and 7B is ductile metal, e.g., aluminum or copper. In the embodiment of the present invention, the metal foil 11 made of an aluminum foil. Further, a longitudinal length of the aluminum foil 11 used in the embodiment of the present invention is approximately from 50 mm to 100 mm, and a thickness thereof is approximately from 0.05 mm to 0.2 mm. In this case, a diameter D of that limited range indicated by the broken line in which the voltage decreases in FIG. 8C is approximately from 150 mm to 200 mm. Note that, as the self-discharge static eliminator 10, an aluminum tape configured such that a layer of the conductive adhesive 12 is formed on the aluminum foil 11 can be used by cutting. Further, as illustrated in FIG. 7C, the self-discharge static eliminator 10 can be made of a conductive film integrally formed on the surface of the thin wall 9. Even in this case, it is preferable that many tip parts 14 be formed in a peripheral portion of the conductive film in addition to the corner portion 13 as illustrated in FIG. 9B.

Note that, as described with reference to FIG. 8B, even if the self-discharge static eliminator 10 is provided on the back surface of the thin wall 9, the voltage of that part of the front surface of the thin wall 9 which is within the limited range indicated by the broken line around the mounting part of the self-discharge static eliminator 10 decreases as illustrated in FIG. 8C. However, in a case where the self-discharge static eliminator 10 is provided on the back surface of the thin wall 9, a decrease amount of the voltage on the front surface of the thin wall 9 is smaller than a case where the self-discharge static eliminator 10 is provided on the front surface of the thin wall 9. The reason why the voltage on the front surface of the thin wall 9 decreases even if the self-discharge static eliminator 10 is provided on the back surface of the thin wall 9 as such is presumably because a decrease of the voltage on the back surface of the thin wall 9 appears on the front surface of the thin wall 9 as a decrease of the voltage on the front surface of the thin wall 9.

Now, as described above, it is found that, in the intake device 2 illustrated in FIG. 1, a voltage value of the intake passage wall surface defining the intake passage, that is, voltage values on the front surfaces of the pipe wall of the intake air introduction pipe 5, the peripheral wall of the air cleaner 3, the pipe wall of the intake air duct 6, the peripheral wall of the surge tank 4, and the pipe walls of the intake air branch pipes 7 reach 1000 (v) or more, which is a high voltage. In this case, from experimental results illustrated in FIGS. 6A and 6B, it is presumed that a flow of intake air flowing through the intake device 2 is changed by the high voltage, which has an influence on intake efficiency. In view of this, as a result of experiments about intake efficiency, it was found that a high voltage caused due to electric charges charged to the intake passage wall surface decreases intake efficiency, and in this case, it was found that intake efficiency improved by providing the self-discharge static eliminator 10 on an intake passage wall surface.

In view of this, in the present invention, that intake device of the vehicle in which the intake passage wall surface defining the intake passage is charged with positive charges includes the self-discharge static eliminator 10 that can decrease an electrification charge amount on that part of the intake passage wall surface which is within a limited range around a mounting part of the self-discharge static eliminator 10, by providing the self-discharge static eliminator 10 on the intake passage wall surface. The self-discharge static eliminator 10 is provided on the intake passage wall surface. In this case, the mounting part of the self-discharge static eliminator 10 on the intake passage wall surface has a large influence on improvement of intake efficiency. In view of this, the following describes a preferable mounting part of the self-discharge static eliminator 10.

The inventor carried out experiments and examinations on a preferable mounting part of the self-discharge static eliminator 10. As a result of the experiments and examination, the following fact was found. That is, in the intake device 2 illustrated in FIG. 1, when the self-discharge static eliminator 10 is provided in an intake air flow path reduced section part at which an intake air flow path section on an intake air flow path is reduced, intake efficiency improves markedly. In this case, an intake air flow path reduced section part at which the intake air flow path section is first reduced on the intake air flow path is an air introduction port to the intake device 2. In view of this, first of all, with reference to FIG. 5A illustrating an enlarged sectional side view of the air introduction port to the intake device 2, namely, the intake air introduction pipe 5, the following describes a preferable mounting part of the self-discharge static eliminator 10 at the air introduction port to the intake device 2.

Figure 5A:
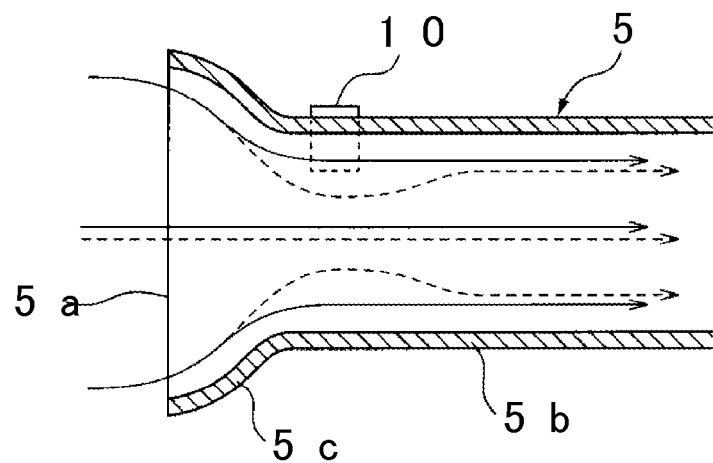
FIG. 5A is a view to describe an intake air flow in the intake air introduction pipe to the air cleaner and the intake air branch pipe extending from the surge tank toward the engine.

With reference to FIG. 5A, the intake air introduction pipe 5 includes a tubular portion 5b having a uniform flow path section, and an expanded portion 5c that is gradually expanded from a tip end of the tubular portion 5b toward the intake air introduction port 5a. Note that, in FIG. 5A, an arrow of a continuous line indicates a flow of intake air at the time when a voltage of the intake air introduction pipe 5 due to electro static charge is low, and an arrow of a broken line indicates a flow of intake air at the time when the voltage of the intake air introduction pipe 5 due to electro static charge is high. An inner peripheral surface of the expanded portion 5c is formed in such a shape that causes intake air flowing from the intake air introduction port 5a along an inner wall surface of the expanded portion 5c to move along the inner wall surface of the expanded portion 5c, and then move along an inner wall surface of the tubular portion 5b as long as possible. As a result, at the time when the voltage of the intake air introduction pipe 5 due to electro static charge is low, the intake air flowing from the intake air introduction port 5a along the inner wall surface of the expanded portion 5c moves along the inner wall surface of the expanded portion 5c, and then moves along the inner wall surface of the tubular portion 5b, as indicated by the arrow of the continuous line.

In the meantime, as can be seen from FIG. 5A, a flow direction of the intake air flowing along the inner wall surface of the expanded portion 5c is directed toward a central part of the flow path section in the vicinity of an inlet of the tubular portion 5b, so that the intake air flowing along the inner wall surface of the expanded portion 5c flows so as to be easily detached from the inner wall surface of the tubular portion 5b in the vicinity of the inlet of the tubular portion 5b. As a result, when the voltage of the intake air introduction pipe 5 increases due to electro static charge, the intake air flowing along the inner wall surface of the expanded portion 5c is detached from the inner wall surface of the tubular portion 5b due to an electric repulsive force at the time when the intake air flows into the tubular portion 5b, as indicated by the arrow of the broken line, and the intake air moves for a while. After that, the intake air moves along the inner wall surface of the tubular portion 5b.

When the intake air flow path changes as indicated by the arrow of the broken line, the intake air flow path section is reduced, so that an intake resistance increases. As a result, intake efficiency decreases. In view of this, in order to remove electrification charges causing the reduction of the intake air flow path section, the self-discharge static eliminator 10 is provided on a part where a reduction action of the intake air flow path section is caused, that is, an outer wall surface of that end of the tubular portion 5b which is closer to the expanded portion 5c. When the self-discharge static eliminator 10 is provided on the outer wall surface of that end of the tubular portion 5b which is closer to the expanded portion 5c, voltages on the inner wall surface of the expanded portion 5c and on the inner wall surface of the tubular portion 5b within a given range around the self-discharge static eliminator 10 decrease. Accordingly, the intake air flowing along the inner wall surface of the expanded portion 5c moves along the inner wall surface of the expanded portion 5c, and then moves along the inner wall surface of the tubular portion 5b, as indicated by the arrow of the continuous line. As a result, intake efficiency can be improved.

Note that, in this example, the self-discharge static eliminator 10 is placed on the outer wall surface of the tubular portion 5b so that the self-discharge static eliminator 10 extends along an outer circumferential direction of the tubular portion 5b as illustrated in FIGS. 5A and 2A. Further, as illustrated in FIG. 2B, in a case where the tubular portion 5b has an oblong sectional shape, a plurality of self-discharge static eliminators 10 is placed on the outer wall surface of the tubular portion 5b so as to be arranged in line along the outer circumferential direction of the tubular portion 5b.

In the meantime, the self-discharge static eliminator 10 can be provided on the inner wall surface of the tubular portion 5b. However, when the self-discharge static eliminator 10 is provided on the inner wall surface of the tubular portion 5b, air ions in which a positively charged amount is increased due to discharge is sent to a downstream side. In a case where the self-discharge static eliminator 10 is also provided on the downstream side, a discharge action in the self-discharge static eliminator 10 on the downstream side might be obstructed. Further, when the self-discharge static eliminator 10 is provided on the inner wall surface of the tubular portion 5b, the engine 1 may be affected if the self-discharge static eliminator 10 falls off. Accordingly, in the embodiment of the present invention, the self-discharge static eliminator 10 is provided on the outer wall surface of the tubular portion 5b, namely, on an outer wall surface of the intake passage wall.

Note that, as illustrated in FIG. 5A, not only in a case where the voltage of the intake air introduction pipe 5 due to electro static charge is low, but also in a case where the voltage of the intake air introduction pipe 5 due to electro static charge is high, after the intake air flows in the tubular portion 5b for a while, the intake air moves along the inner wall surface of the tubular portion 5b. That is, when the intake air flow path section does not change, the electrification charges do not have an influence that changes the intake air flow path section. Accordingly, it is not necessary to provide the self-discharge static eliminator 10 on the downstream side of the tubular portion 5*b*. In the meantime, when the intake air flows into the air cleaner 3 from the intake air introduction pipe 5, the intake air flow just expands. Accordingly, even at this time, the electrification charges do not affect the intake air flow path section, and thus, it is not necessary to provide the self-discharge static eliminator 10 at an outlet port of the intake air introduction pipe 5. That is, in terms of the intake air introduction pipe 5, the self-discharge static eliminator 10 is provided only on the outer wall surface of that end of the tubular portion 5*b* which is closer to the expanded portion 5*c*.

An intake air flow path reduced section part at which the intake air flow path section is reduced next on the intake air flow path is an outlet port of the air cleaner 3, that is, an inlet portion of the intake air duct 6. After the intake air flows into the intake air duct 6, the intake air flow path section is not reduced until the intake air flows into the intake air branch pipe 7. An intake air flow path reduced section part at which the intake air flow path section is reduced next on the intake air flow path is an outlet port of the surge tank 4, that is, an inlet portion of the intake air branch pipe 7. After the intake air flows into the intake air branch pipe 7, the intake air flow path section is not reduced. Accordingly, in the intake device 2 illustrated in FIG. 1, remaining intake air flow path reduced section parts at which the intake air flow path section is reduced are only the inlet portion of the intake air duct 6 and the inlet portion of the intake air branch pipe 7.

The inlet portion of the intake air duct 6 and the inlet portion of the intake air branch pipe 7 have a similar shape, so that the inlet portion of the intake air duct 6 and the inlet portion of the intake air branch pipe 7 accordingly have a similar flow of the intake air. Accordingly, the inlet portion of the intake air duct 6 and the inlet portion of the intake air branch pipe 7 have a similar preferable mounting part of the self-discharge static eliminator 10. In view of this, with reference to FIG. 5B illustrating an enlarged sectional side view of the outlet port of the surge tank 4, namely, the intake air branch pipe 7, the following describes a preferable mounting part of the self-discharge static eliminator 10 only at the outlet port of the surge tank 4 in detail.

Figure 5B:
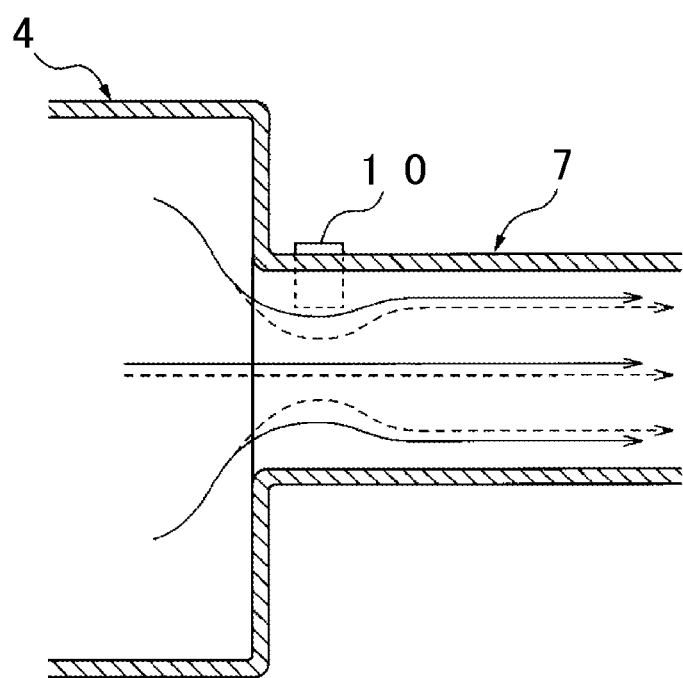
FIG. 5B is a view to describe an intake air flow in the intake air introduction pipe to the air cleaner and the intake air branch pipe extending from the surge tank toward the engine.

Referring now to FIG. 5B, the intake air branch pipe 7 is opened on a flat inner wall surface of the surge tank 4. Accordingly, even if a voltage of the intake air branch pipe 7 due to electro static charge is low, an intake air flow flowing into the intake air branch pipe 7 from the surge tank 4 is detached from the inlet portion of the intake air branch pipe 7 as indicated by an arrow of a continuous line. In this case, when the voltage of the intake air branch pipe 7 due to electro static charge is increased, a detachment degree of the intake air flow at the inlet port of the intake air branch pipe 7 becomes large as indicated by an arrow of a broken line. When the detachment degree of the intake air flow at the inlet portion of the intake air branch pipe 7 becomes large, the intake air flow path section is greatly reduced, so that an intake resistance increases. As a result, intake efficiency decreases.

In view of this, in order to remove electrification charges causing the reduction of the intake air flow path section, the self-discharge static eliminator 10 is provided on a part where a reduction action of the intake air flow path section is caused, that is, an outer wall surface of that end of the intake air branch pipe 7 which is closer to the surge tank 4. When the self-discharge static eliminator 10 is provided on the outer wall surface of that end of the intake air branch pipe 7 which is closer to the surge tank 4 as such, voltages of an inner wall surface of the surge tank 4 and an inner wall surface of the intake air branch pipe 7 within a given range around the self-discharge static eliminator 10 decrease, so that the detachment degree of the intake air flow flowing into the intake air branch pipe 7 from the surge tank 4 is decreased as indicated by an arrow of a continuous line. As a result, intake efficiency can be improved. Note that, also in this example, the self-discharge static eliminator 10 is placed on the outer wall surface of the intake air branch pipe 7 so that the self-discharge static eliminator 10 extends along an outer circumferential direction of the intake air branch pipe 7 as illustrated in FIGS. 5B and 4.

In the meantime, as can be seen from FIGS. 1 and 3, the intake air duct 6 is also opened on a flat inner wall surface of the air cleaner 3. Even if a voltage of the intake air duct 6 due to electro static charge is low, the intake air flow flowing into the intake air duct 6 from the air cleaner 3 is detached from the inlet portion of the intake air duct 6. Thus, similarly to the case of the intake air branch pipe 7 illustrated in FIG. 5B, when the voltage of the intake air duct 6 due to electro static charge is increased, a detachment degree of the intake air flow at the inlet portion of the intake air duct 6 becomes large. When the detachment degree of the intake air flow at the inlet portion of the intake air duct 6 becomes large, the intake air flow path section is greatly reduced, so that an intake resistance increases. As a result, intake efficiency decreases.

In view of this, also in terms of the intake air duct 6, in order to remove electrification charges causing the reduction of the intake air flow path section, the self-discharge static eliminator 10 is provided on a part where a reduction action of the intake air flow path section is caused, that is, an outer wall surface of that end of the intake air duct 6 which is closer to the air cleaner 3. When the self-discharge static eliminator 10 is provided on the outer wall surface of that end of the intake air duct 6 which is closer to the air cleaner 3 as such, voltages of an inner wall surface of the air cleaner 3 and an inner wall surface of the intake air duct 6 within a given range around the self-discharge static eliminator 10 decrease, so that the detachment degree of the intake air flow flowing into the intake air duct 6 from the air cleaner 3 is decreased. As a result, intake efficiency can be improved. Note that, also in this example, the self-discharge static eliminator 10 is placed on the outer wall surface of the intake air duct 6 so that the self-discharge static eliminator 10 extends along an outer circumferential direction of the intake air duct 6 as illustrated in FIG. 3.

As such, in the embodiment of the present invention, the self-discharge static eliminator 10 is provided on an intake passage wall surface of the intake air flow path reduced section part at which the intake air flow path section is reduced on the intake air flow path, namely, in any of the air introduction port to the intake device 2, the outlet port of the air cleaner 3, and the outlet port of the surge tank 4. More specifically, the self-discharge static eliminator 10 is provided on any of the outer wall surface of the inlet portion of the tubular portion 5*b* of the intake air introduction pipe 5, the outer wall surface of the inlet portion of the intake air duct 6, and the outer wall surface of the inlet portion of the intake air branch pipe 7.

In this case, in order to obtain highest intake efficiency, it is preferable that the self-discharge static eliminator 10 be provided on intake passage wall surfaces of all the intake air flow path reduced section parts at which the intake air flow path section is reduced on the intake air flow path. In this case, the self-discharge static eliminator 10 is provided on all of the air introduction port to the intake device 2, the outlet port of the air cleaner 3, and the outlet port of the surge tank 4. More specifically, the self-discharge static eliminator 10 is provided on all of the outer wall surface of the inlet portion of the tubular portion 5b of the intake air introduction pipe 5, the outer wall surface of the inlet portion of the intake air duct 6, and the outer wall surface of the inlet portion of the intake air branch pipe 7.

On the other hand, as described above, it is not necessary to provide the self-discharge static eliminator 10 on the other parts except for the intake air flow path reduced section parts at which the intake air flow path section is reduced on the intake air flow path, namely, on the other parts except for the air introduction port to the intake device 2, the outlet port of the air cleaner 3, and the outlet port of the surge tank 4. That is, in the embodiment of the present invention, the self-discharge static eliminator 10 is provided only on the air introduction port to the intake device 2, the outlet port of the air cleaner 3, or the outlet port of the surge tank 4.

Note that, as can be seen from FIGS. 5A and 5B, when an electrification charge amount of the intake passage wall increases, the intake air flow path section is reduced due to the electrification charge. At this time, detachment of the intake air occurs. Accordingly, it may be said that the self-discharge static eliminator 10 is provided on an intake passage wall surface that causes detachment of the intake air on the inner wall surface of the intake passage wall at the time when an electrification charge amount increases.

What is claimed is:

1. An intake device for a vehicle, in which an intake passage wall surface defining an intake passage is charged with positive charges, the intake device comprising:
   a self-discharge static eliminator that is provided on an intake passage wall surface and that decreases an electrification charge amount on that part of the intake passage wall surface which is within a predetermined range around a mounting part of the self-discharge static eliminator, by providing the self-discharge static eliminator on the intake passage wall surface, wherein
   the self-discharge static eliminator is provided on an outer wall surface of the intake passage wall,
   the self-discharge static eliminator is a metal foil attached to the intake passage wall surface with a conductive adhesive, or a conductive film integrally formed on the intake passage wall surface, and
   the self-discharge static eliminator includes a corner portion for causing self-discharge.

2. The intake device according to claim 1, wherein
   the self-discharge static eliminator is provided on the intake passage wall surface of an intake air flow path reduced section part at which an intake air flow path section is reduced on an intake air flow path.

3. The intake device according to claim 2, wherein
   the self-discharge static eliminator is provided on at least one of an air introduction port to the intake device, an air cleaner outlet port, and a surge tank outlet port.

4. The intake device according to claim 2, wherein
   the self-discharge static eliminator is provided only on an air introduction port to the intake device, an air cleaner outlet port, and a surge tank outlet port.

5. The intake device according to claim 1, wherein
   the self-discharge static eliminator is provided on the intake passage wall surface that causes detachment of intake air on an inner wall surface of the intake passage wall at the time when an electrification charge amount increases.

6. The intake device according to claim 1, wherein
   the intake passage wall is made of a synthetic resin material.

7. The intake device according to claim 1, wherein
   the self-discharge static eliminator has an elongated rectangular planar shape.

* * * * *